United States Patent

Saul

[15] 3,685,424

[45] Aug. 22, 1972

[54] CAMERA COMPUTER APPARATUS
[72] Inventor: Ivar Saul, Portland, Oreg.
[73] Assignee: Tektronix, Inc., Beaverton, Oreg.
[22] Filed: Aug. 4, 1970
[21] Appl. No.: 60,788

[52] U.S. Cl. .................... 95/64 B, 95/10 B, 95/64 C
[51] Int. Cl. .............................................. G03b 9/02
[58] Field of Search ................. 95/64 B, 64 C, 10 B

[56] References Cited

UNITED STATES PATENTS

| | | | |
|---|---|---|---|
| 1,213,485 | 1/1917 | Herz | 95/10 B |
| 2,509,385 | 5/1950 | Ziaylek | 95/64 C |
| 2,912,914 | 11/1959 | Weiss | 95/64 C |
| 2,912,913 | 11/1959 | Bretthauer | 95/64 C |
| 2,874,622 | 2/1959 | Gebele | 95/64 C X |
| 2,829,574 | 4/1958 | Gebele | 95/64 C |
| 2,596,328 | 5/1952 | Dorsey | 95/64 C |

*Primary Examiner*—Samuel S. Matthews
*Assistant Examiner*—Monroe H. Hayes
*Attorney*—Buckhorn, Blore, Klarquist and Sparkman

[57] ABSTRACT

A computer for setting a camera for taking a photograph includes a photometer which is first adjusted in accordance with film speed. The photometer is then operable by aperture adjusting means for matching the illumination of a standard source with the illumination of an image to be photographed. After photometer adjustment, the aperture adjusting means is interrelated with a shutter speed control whereby either quantity may then be altered while maintaining a predetermined exposure value. When the aperture adjusting means is employed for operating the photometer, film speed adjustment is interengaged with the shutter speed control for maintaining an accurate relation between the various quantities.

3 Claims, 4 Drawing Figures

PATENTED AUG 22 1972

IVAR SAUL
INVENTOR

BY
BUCKHORN, BLORE, KLARQUIST & SPARKMAN
ATTORNEYS

IVAR SAUL
INVENTOR

BY
BUCKHORN, BLORE, KLARQUIST & SPARKMAN
ATTORNEYS

CAMERA COMPUTER APPARATUS

BACKGROUND OF THE INVENTION

When taking a photograph of a usual scene, the only known quantity is the speed of the film. It is ordinarily up to the operator to determine the scene brightness and accordingly set the aperture and shutter speed controls on the camera. An exposure meter or the like may also be used to measure brightness of the scene. The brightness can be converted to aperture and shutter speed settings, taking the film speed into consideration, in accordance with calculations made by the operator. Some automatic apparatus is available but generally interrelates only some of the quantities involved, while requiring the manual setting of one or more other values into the camera in accordance with calculation.

It is an object of the invention to provide improved apparatus for automatically adjusting a camera wherein the various camera settings are substantially completely interrelated.

It is a further object of the present invention to provide an improved analog computer apparatus for a camera which apparatus is substantially foolproof in operation while providing maximum operating flexibility.

It is a further object of the present invention to provide an improved apparatus for automatically operating a camera associated with a cathode ray oscilloscope.

It is a further object of the present invention to provide an improved means for interrelating all the various quantities which are ordinarily determined in exposing a film.

SUMMARY OF THE INVENTION

According to the present invention, an adjustable photometer is employed for ascertaining the illumination of an image to be photographed, for example, an electron beam trace on the screen of a cathode ray oscilloscope. The photometer is initially set in accordance with a film speed adjustment. Aperture adjusting means, including a variable iris for selecting a camera lens aperture, is alternatively interengageable with means for adjusting the photometer, or with means for establishing an interrelation between aperture adjustment and shutter speed. When aperture adjusting means is disposed in operative engagement with the photometer, a film speed selecting means is mechanically connected for simultaneous operation of shutter speed adjusting means. However, when the aperture adjusting means and shutter speed adjusting means are mechanically interrelated, the photometer is responsive to the film speed selecting means. In this manner, the various quantities, which are ordinarily determined for film exposure, are accurately and continuously interrelated in a substantially foolproof manner for executing the usual exposure equation. The various quantities are not only mathematically ascertained, but also the camera itself if functionally operated to execute the various quantities determined.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

DETAILED DESCRIPTION

Figure 1:
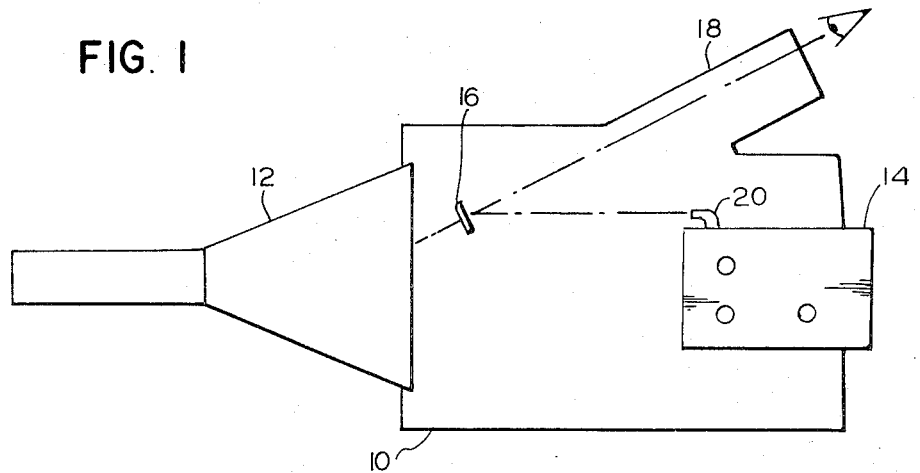
FIG. 1 is a schematic side view of camera apparatus according to the present invention as associated with the cathode ray tube of a cathode ray oscilloscope.

Referring to the drawings and particularly to FIG. 1, a camera, generally indicated at 10, is positioned in front of the screen of a cathode ray tube 12 and is employed for recording the visible trace of an electron beam on the face of the tube. The camera is provided with a computer 14 associated with a photometer including a dichroic mirror 16 through which the image on the face of the cathode ray tube may be viewed via a hood 18. A light pipe 20 provides a spot of light on the dichroic mirror 16, which is observed concurrently with an electron beam trace. Then adjustments are made on the computer 14 for matching the illumination of such spot with the illumination of the beam trace to be photographed. In accordance with the present invention, these adjustments automatically prepare the camera for photographing the image.

Figure 2:
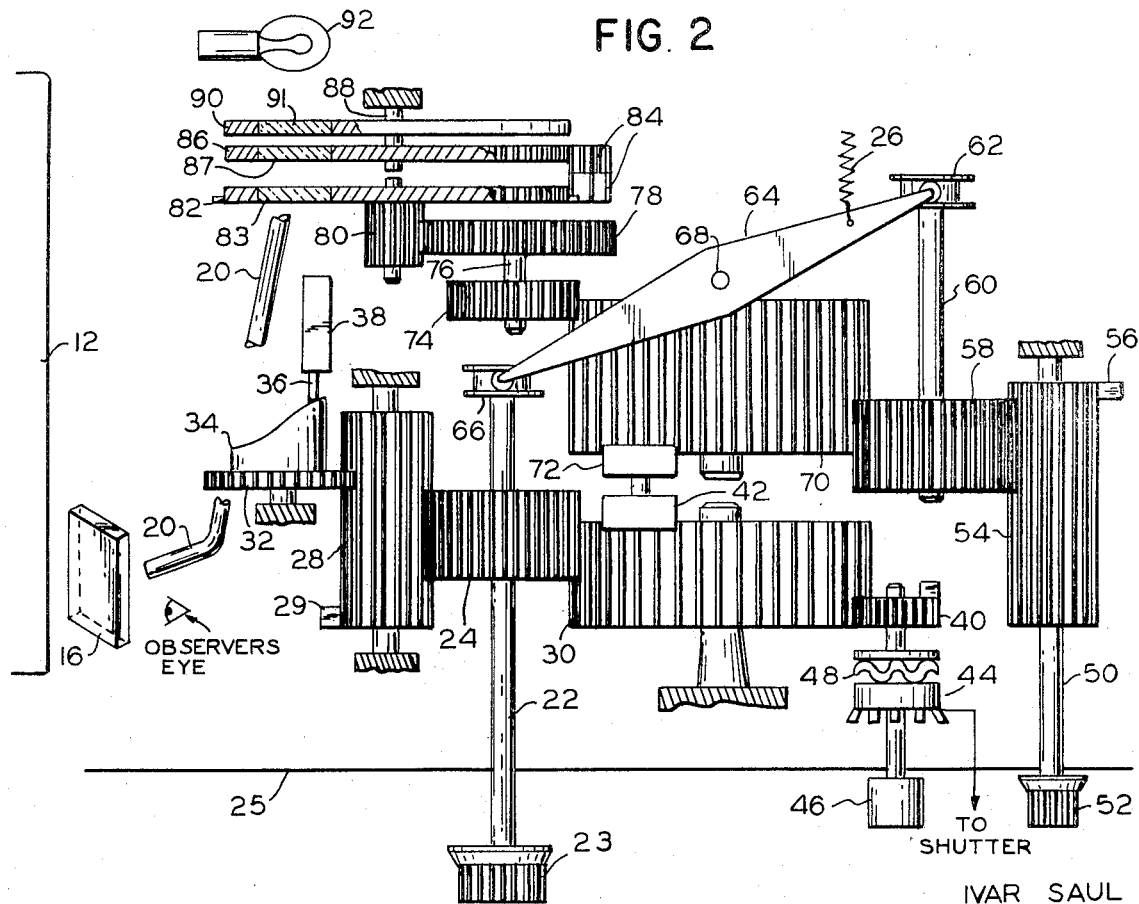
FIG. 2 is a schematic illustration of computer apparatus according to the present invention in a first or normal operating position.
Figure 3:
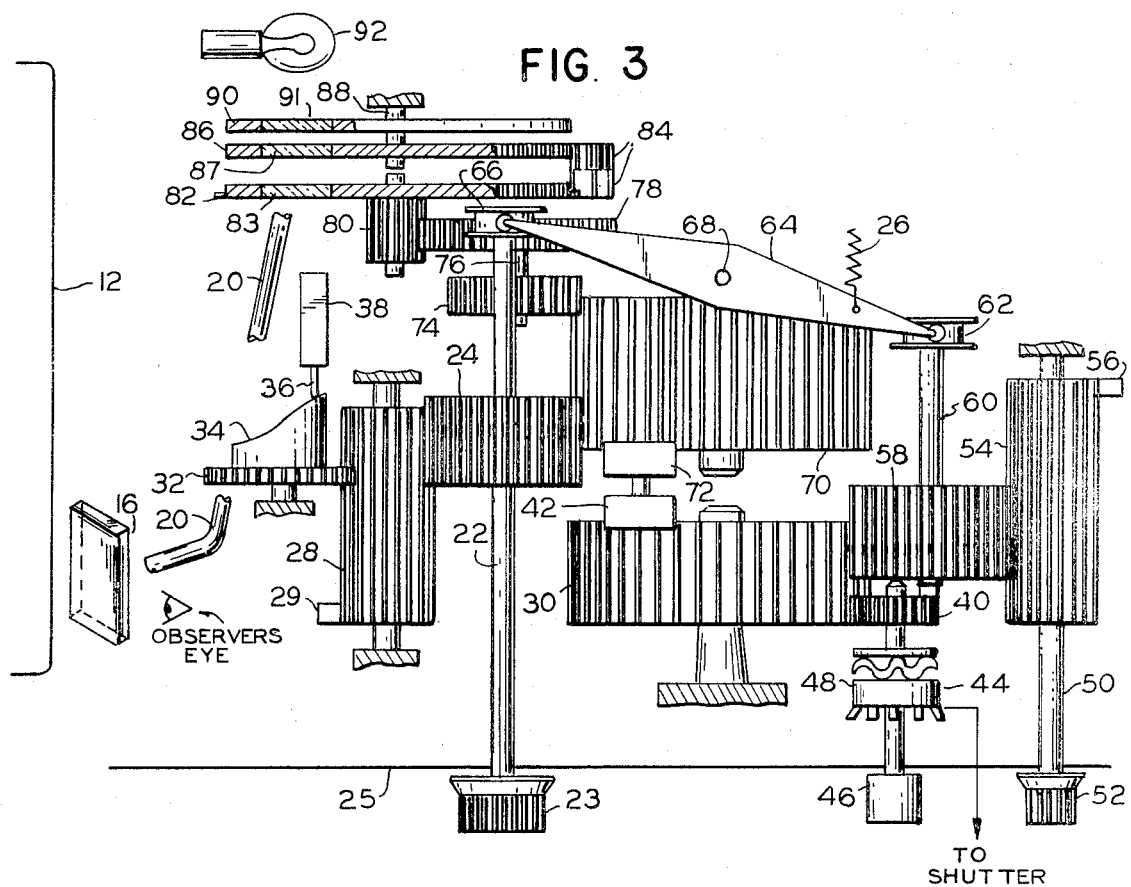
FIG. 3 is a schematic illustration of computer apparatus according to the present invention in a second operating position.

The computer in accordance with the present invention is illustrated in FIGS. 2 and 3. The elements in the apparatus in each of these views are substantially identical, and only the operative position of the mechanism is changed to illustrate operation of the device. Referring to FIGS. 2 and 3, an aperture adjusting means comprises a rotatable and slidable shaft 22 extending through panel 25 and upon which is mounted an aperture gear 24 and an operating knob 23. Gear 24 is keyed to the shaft and consequently moves in a longitudinal direction when the shaft is depressed as illustrated in FIG. 3, against the bias of spring 26. Gear 24 normally meshes with elongated gear 28 as well as with transfer gear 30. Gear 28 turns cam operating gear 32 which supports and turns iris cam 34, and is provided with a mechanical stop 29 for preventing more than 360° rotation of gear 28. Iris cam 34 is contacted by cam follower 36 associated with variable iris mechanism 38, hereinafter more fully described, for varying the lens aperture of the camera. It is noted that gear 24 is in continuous meshing relation with gear 28 and consequently knob 23 will rotate gear 32 and cam 34 for operating the variable iris regardless of whether or not knob 23 is depressed toward panel 25.

Transfer gear 30, with which gear 24 meshes only in the FIG. 2 position, also engages shutter speed gear 40 as well as detent 42. Shutter speed gear 40 is attached to the shaft of shutter speed control 44 mounted on panel 25 and having an operating knob 46 as well as a position detent 48. Gear 40 is also provided with a stop for preventing more than 360° rotation. The various switch positions of control 44 bring about different shutter speeds. The camera shutter is desirably an electromagnetically operated shutter as described and claimed in my copending application, Ser. No. 845,354, filed July 28, 1969, now U.S. Pat. No. 3,595,153 and entitled "Electrically Operated Shutter".

The apparatus is also provided with a film speed setting control comprising a shaft 50 carrying a front panel knob 52 for rotating long gear 54 mounted on shaft 50. Gear 54 is provided with a mechanical stop 56 for preventing more than 360° rotation of the control.

In the position of the mechanism illustrated in FIG. 2, gear 54 engages a gear 58 carried by a longitudinally slidable shaft 60. Shaft 60 is provided with camming means 62 for engaging one end of a rocking arm 64, the opposite end of which is engaged by camming means 66 mounted on shaft 22. Rocking arm 64 is pivoted at 68 whereby, when knob 23 is depressed towards panel 25, arm 64 rotates from the FIG. 2 position to the FIG. 3 position against the bias of spring 26. Gear 58 carried on shaft 60 normally engages transfer gear 70, but when knob 23 is depressed to the FIG. 3 position, gear 58 engages transfer gear 30, as gear 24 engages gear 70 instead of gear 30. It is noted that gear 58 continuously meshes with gear 54 mounted on shaft 50.

Large transfer gear 70 also engages a detent 72 as well as a smaller gear 74 mounted on the same shaft 76 with gear 78. Gear 78, in turn, meshes with pinion 80 for rotating a first light attenuating filter wheel 82. Light attenuating filter wheel 82 has a gear sector for turning intermittent motion pinion 84 which, in turn, rotates light attenuating filter wheel 86 on shaft 88. A color matching filter wheel 90 is also mounted on shaft 88 for independent rotation with respect thereto. The filter wheels together with gears 70, 74, 78, 80 and 84 form a part of the photometer means according to the present apparatus.

Also included in the photometer means is a standard light source comprising lamp bulb 92 which emits light through filter sections 91, 87 and 83 of light filter wheels 90, 86 and 82, respectively. Filter sections 87 and 83 are employed for variable light attenuating purposes whereby, as filter wheels 82 and 86 rotate, a varying amount of light from lamp bulb 92 will pass through these filters. Filter section 91, on the other hand, is a color matching filter, suitably operated by a thumbwheel, for matching the light color emitted from lamp bulb 92 with the light color present at the cathode ray tube trace.

The photometer further comprises light pipe 20 (illustrated as broken in FIGS. 2 and 3 for ease of illustration) and dichroic mirror 16 also illustrated in FIG. 1. As was also illustrated in FIG. 1, the face or screen of the cathode ray tube 12 is viewed through the dichroic mirror at the same time as a light spot emitted from light pipe 20 is seen upon the dichroic mirror. The light spot is, of course, produced by light from lamp bulb 92 passing through the respective filters.

Figure 4:
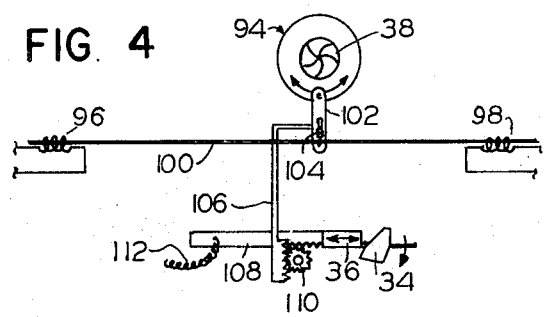
FIG. 4 is a schematic illustration of a variable iris means employed according to the present invention.

In FIG. 4 a shutter mechanism 94 is further illustrated and includes variable iris mechanism 38 which is opened and closed by electromagnets 96 and 98. The electromagnets 96 and 98 operate an armature or plunger 100 to open the shutter for a predetermined time in accordance with selectable timing circuitry (not shown) associated with the electromagnets. The plunger 100 opens and closes the rotatable actuator arm 102 having a movable pivot 104 attached to rack 106. Rack 106 is geared to rack 108 by way of pinion 110, and is moved back and forth by cam follower 36 against the bias of spring 112. As hereinbefore mentioned, cam 34 operates cam follower 36. The shutter mechanism is more fully described and claimed in my aforementioned application, Ser. No. 845,354. In general operation, the rotation of cam 34 moves pivot 104 whereby to adjust the aperture provided by the iris mechanism 38 when the shutter is opened.

Considering the operation of the system according to the present invention, and referring first to FIG. 2, gear 24 normally interconnects gear 28 and transfer gear 30, the latter in turn rotating gear 40, whereby aperture adjustment and shutter speed adjustment are dependent upon one another. That is, rotation of knob 23 for decreasing the iris opening will normally increase the period of time the shutter will be opened, whereby to maintain an overall exposure value substantially constant. Thus, rotation of either aperture knob 23 or shutter speed knob 46 will rotate the other for producing a substantially opposite effect in its numerical setting. At the same time, film speed knob 52 is operatively connected to the photometer via gears 58, 70, 74, 78 and 80. It is noted gears 24 and 58 are wide enough so as to never be out of contact with one or the other of the transfer gears.

In the operation of the present invention, the film speed is normally the initially known quantity and is consequently adjusted via knob 52, in accordance with a scale provided therefor on front panel 25, whereby to adjust the photometer initially for film speed. At this time the photometer is not used for matching the cathode ray tube trace with the spot of light provided on dichroic mirror 16 from light pipe 20.

Assuming the film speed is now set into the computer via knob 52, and an image is present on the face of cathode ray tube 12 which it is desired to photograph, knob 23 is depressed to provide the interrelationship illustrated in FIG. 3. Rotation of knob 23 will, of course, adjust the aperture opening by means of adjustable iris mechanism 38. However, speed control 44 will no longer be affected. Rotation of knob 23 will, at this time, rotate transfer gear 70 and the remaining gear train of the photometer. As knob 23 is rotated, filter wheels 82 and 86 are rotated so as to vary the light provided by light pipe 20. The observer views the cathode ray tube screen image through the dichroic mirror 16 with knob 23 depressed and rotates knob 23 until the spot of light provided by the photometer substantially matches the light intensity of the image to be photographed. At the same time, gears 54 and 30 are interconnected by gear 58 so that a change in either would have a corrective effect on the other should either be changed.

After adjustment of the photometer by means of depressed aperture knob 23, the aperture knob 23 is released so that gear 24 returns to engagement with transfer gear 30. At the same time, of course, gear 58 returns to meshing engagement with transfer gear 70. As a result of the above photometer adjustment, a setting of exposure value will be applied to the aperture and shutter speed setting adjustments. With gears 28, 24 and 30 in interengagement, either knob 23 or 46 may be rotated without upsetting this exposure value. Rotation of either knob 23 or knob 46 also rotates the other, and for any change in setting, the iris opening and the shutter speed will properly compensate for maintaining the exposure value the same. Normally, after the aperture knob 23 has returned to the position illustrated in FIG. 2, the shutter speed knob 46 will be adjusted to provide a shutter speed desired for the particular event to be photographed. The aperture mechanism will automatically follow the shutter speed selection in order to maintain exposure value constant.

The present apparatus operates according to the mathematical relationship $A^2/T = 2^{Ev} = BS/K$ where $A$ is the actual $f$-number of the aperture, $T$ is the shutter speed in seconds, $Ev$ is the exposure value, $B$ is illumination brightness as measured by the photometer, $S$ is $ASA$ film speed, and $K$ is a constant. Expressed logarithmically, this relationship reduces to the following:

$$\text{Log}_2 A^2 + \text{Log}_2 1/T = \text{Log}_2 NS + \text{Log}_2 B/NK \quad (1)$$

where $N$ is another constant.

If the aperture control is pushed in, then the mathematical relationship of the control may be expressed as follows:

$$\text{Log}_2 A^2 - \text{Log}_2 B/NK = \text{Log}_2 NS - \text{Log}_2 1/T \quad (2)$$

In the first of the two expressions, the basic relationship is given. At the time represented by this equation, i.e. for the position of parts illustrated in FIG. 2, there is no interaction between the aperture-shutter gearing system and the film speed-photometer system. However, the basic equation will be obeyed since the gearing is initially preset to maintain the equality. When the aperture knob is pushed in, the second of the two expressions applies so that when the aperture knob is rotated, the amount of light attenuation of the comparison spot from light pipe 20 is changed until the spot matches the cathode ray tube trace, whereby the "exposure value" is changed. Now, if the aperture knob is allowed to come back to the FIG. 2 position, the exposure computation is complete and the aperture and shutter speed knobs are then locked into a position related to a new total exposure value for matching the desired film speed and light conditions. The various controls and panel scales are set up according to logarithmic values whereby to implement the above expressions.

Although computer operation is desired, it is obvious the various quantities may also be altered for making fine adjustment, in case, for example, the film speed is other than actually anticipated or if photometer comparison was improperly made. Aperture opening and shutter speed may at any time be adjusted relative to one another by doing so with the aperture knob 23 depressed.

While I have shown and described a preferred embodiment of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. A computer for a camera, comprising:

a first aperture-setting gear provided with gearing operatively connected thereto and a variable iris responsive to said gearing for varying the lens aperture of said camera, shutter speed adjusting means including a gear rotatable therewith, gearing means for normally interrelating said aperture-setting gear and said shutter speed gear, a variable photometer apparatus for comparing an image to be photographed with a source, said photometer apparatus including light attenuating filters provided with gearing for rotating said filters in the path of light from said source with which an image to be photographed may be compared, film speed setting means including a gear normally coupled in operative relation to the gearing of said photometer, and means for simultaneously moving said aperture-setting gear into operative relation with said photometer gearing while providing a geared connection between said film speed setting gear and said shutter speed gear in place of said coupling with said photometer.

2. A photographic exposure computing means comprising:

adjustable aperture means including manually actuated drive means for adjusting said aperture means;

adjustable shutter means including manually adjustable drive means for adjusting said shutter speed means;

adjustable film speed indicating means;

adjustable photometer means;

manually actuated means including first connecting means for interconnecting said aperture means with said shutter speed means for simultaneous adjustment by either of said drive means and second connecting means for interconnecting said film speed indicating means with said photometer means for adjustment of said photometer means by said film speed indicating means when said aperture means is interconnected with said shutter speed means;

shifter means for simultaneously shifting said first and second connecting means to disconnect said aperture means and said shutter speed means and interconnect said aperture means with said photometer means and simultaneously disconnect said aperture means and said shutter speed means and interconnect said shutter speed means with said film speed indicating means.

3. A computer for a camera, comprising:

a first aperture-setting gear provided with gearing operatively connected thereto and a variable iris responsive to said gearing for varying the lens aperture of said camera;

shutter speed adjusting means including a gear rotatable therewith;

gearing means for normally interrelating said aperture-setting gear and said shutter speed gear;

a variable photometer apparatus for comparing an image to be photographed with a source, said photometer apparatus including light attenuating filters provided with gearing for rotating said filters in the path of light from said source with which an image to be photographed may be compared;

film speed setting means including a gear normally coupled in operative relation to the gearing of said photometer;

means for simultaneously moving said aperture-setting gear into operative relation with said photometer gearing while providing a geared connection between said film speed setting gear and said shutter speed gear in place of said coupling with said photometer;

said simultaneous moving means comprising a rocking arm operatively connected for moving a shaft on which said aperture-setting gear is mounted, and a second gear normally disposed in interengaging relation between said film speed gear and said photometer gearing;

said second gear having a shaft also movable by said rocking arm for moving said second gear into operative relation between said film speed setting gear and said shutter speed gear when said aperture-setting gear is moved into operative relation with said photometer gearing.

* * * * *